July 26, 1932. B. H. WHITE Re. 18,539

BUCKLE

Original Filed March 26, 1926

INVENTOR

Birdora H. White

BY Whittemore Hulbert
Whittemore & Belknap

ATTORNEYS

Reissued July 26, 1932

Re. 18,539

UNITED STATES PATENT OFFICE

BIRDORA H. WHITE, OF CHICAGO, ILLINOIS

BUCKLE

Original No. 1,670,395, dated May 22, 1928, Serial No. 97,702, filed March 26, 1926. Application for reissue filed May 14, 1930. Serial No. 452,416.

The invention relates to buckles for supporting garments and more particularly to a fastening device of this character for use in connection with the straps of garments such as overalls and the like.

The particular construction of the buckle involves a frame with a spring slide associated therewith and one of the principal objects of this invention is to provide means for detachably connecting this spring slide to the frame so as to facilitate the manufacture and assembly of the device. As a consequence of this the cost of production and of assembling is materially lessened and the device rendered more practical and commercially satisfactory.

A further object of this invention is to provide a buckle which includes a frame and a loop formed integral with the frame, the loop being adapted for engagement with a button or with the material adjacent a buttonhole and the frame being adapted for adjustable connection to a strap or the like.

Various other objects, advantages and novel details of construction will be made more apparent as this description proceeds especially when considered in connection with the accompanying drawing, wherein.

Figure 1:
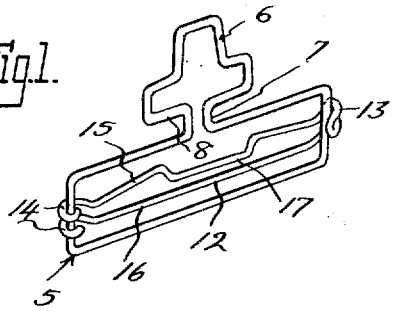
Figure 1 is a perspective view of a buckle as seen from the rear.

Referring then particularly to Figures 1 to 4 of the drawing, it will be noted that there is illustrated a buckle comprising a frame designated generally by the reference character 5 and a loop 6 which is integrally connected to the frame 5 by a neck 7. The frame 5 is provided with means providing for the adjustable connection of a strap to this frame in a manner which will hereinafter be more fully described. The loop 6 is preferably a clover leaf shaped loop, as illustrated, adapted for engagement with a button, and is preferably provided with the portions 8 which extend at substantially right angles to the neck 7 and substantially parallel to one side of the frame 5 whereby these portions of the loop 6 are adapted for hooking engagement with the material adjacent a buttonhole.

Figure 5:
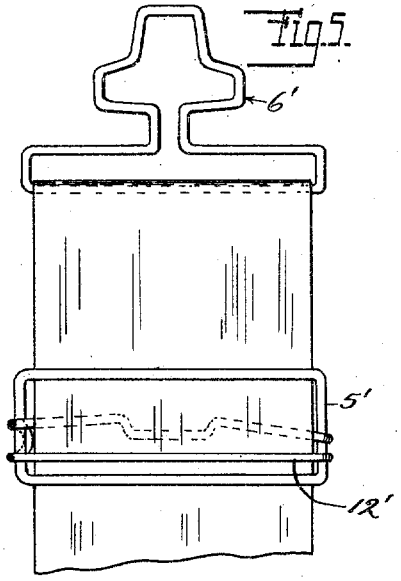
Figure 5 is a view showing the invention used in connection with the different form of buckle.
Figure 2:
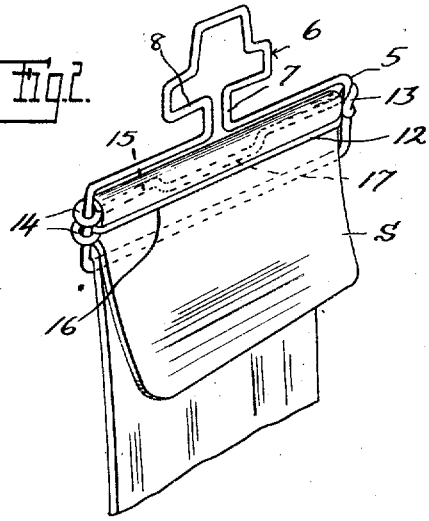
Figure 2 is a similar view with a strap of a garment associated therewith.
Figure 3:
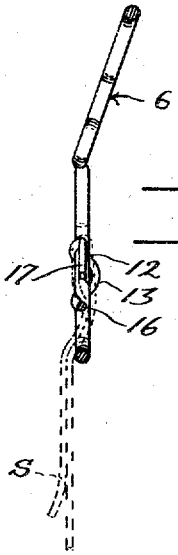
Figure 3 is a vertical longitudinal sectional view through the buckle.
Figure 4:
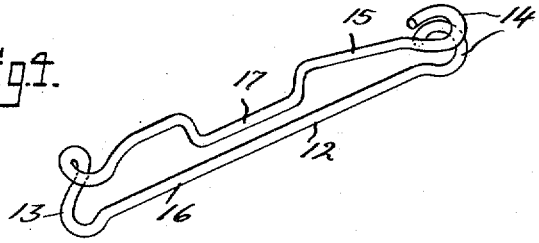
Figure 4 is a separated perspective view of the spring slide.

As brought out before, the frame 5 is provided with means which permit the adjustable connection of a strap to this frame and this means, as illustrated, may comprise a slide 12, here indicated as a spring slide, over and through which the strap S of the garment is looped for adjustably securing the buckle thereto. While the frame 5 and loop 6 are preferably integrally connected, as illustrated in Figure 1, the slide 12 may, if desired, be associated with a buckle 5′ in which the loop member 6′ is formed as a separate member, as illustrated in Figure 5 of the drawing.

One of the features of this invention consists in the provision of means for detachably connecting the slide 12 to the frame 5 and to this end the slide is provided with hooked end portions 13 and 14 which are adapted to detachably and slidably engage the ends of the frame 5 in a manner most clearly illustrated in Figure 1. Considering the specific construction of the slide 12, it will be noted that it may be conveniently formed of a single length of material such as wire bent into a substantial U-shape and having the closed end of the U-shape bent to provide the hooked portion 13, while each of the free ends are bent to form the hooked portion 14. The hooked portions 13 and 14 are so formed that the intermediate leg portions 15 and 16 of the slide lie substantially intermediate the plane of the hooked end portions or in other words, in a plane substantially coincident with the axes of the hooked end portions 13 and 14. In this manner the accidental separation of the detachable slide from the frame 5 after assembly is prevented as the legs 15 and 16 of the slide lie in the same plane as the longitudinal sides of the frame 5. In practice the strip S is adapted to be passed between the legs 15 and 16 of the slide 12 and thence over the upper leg 15 and for this purpose this leg is formed with a laterally off-set portion 17 for clamping engagement with the strap in cooperation with the other leg 16.

While the slide 12 may be assembled with the frame 5 in any one of several different ways, I have found that one convenient manner of assembly consists in first engaging the hooked ends 14 of the slide with one end of the frame 5, with the slide in an angular position but in a plane substantially parallel to the plane of the frame 5. Thus, the hooked end 13 is disposed adjacent the corner of the frame 5 so that this hooked end may be slid axially of the end of the frame 5 and into engagement therewith as shown in Figure 1. During this movement it is necessary, however, to slightly flex the legs 15 and 16 of the slide so that they will clear the adjacent longitudinal side of the frame 5. When, however, the slide 12 has been moved to a position substantially as illustrated in Figure 1, the legs 15 and 16 may be permitted to spring back to their normal position where accidental disengagement of the parts is prevented in the manner aforesaid.

From the above it is believed that the structure and operation of the preferred form of the invention will be clearly apparent. The legs or cross bars 15 and 16 provide means whereby a member such as the strap S may be detachably and adjustably secured to the frame 5. Thus, the strap may be looped around the cross cars in the manner above described and will be gripped and held firmly in adjusted position. The loop 6, being formed integrally with the frame 5, is immediately adjacent this frame and is adapted for engagement with a buttonhole or with the material adjacent a buttonhole. Since it is necessary in using devices of this character to have both a loop similar to the loop 6 and a means for adjusting the effective length of the strap, such as the frame and the associated structure, the combination of these two members in a single construction provides for the more economical manufacture of the articles on a commercial scale. Further, since the loop is maintained in proximity to the frame, adjustment of the strap may be readily accomplished and the frame will be held in a more comfortable position on the body of the wearer.

The manner of connecting the slide 12′ shown in Figure 5 with the frame 5 is identical with that just described so that no detailed description is necessary.

While the slide 12 has been shown and described as a spring slide substantially similar in construction to that shown and claimed in my prior Patent No. 1,444,893 dated Feb. 13, 1923, still the principles of this invention are applicable and may be utilized with facility in connection with a slide or other cooperating element of a buckle of this character, wherein the slide member is not resilient as in the illustrated construction. Therefore, it should be understood that reservation is made to make such changes in the details of construction as may come within the purview of the accompanying claims.

What I claim as my invention is:

1. In a buckle of the class described, a frame member and a spring slide connected thereto, the said slide comprising a single length of material bent to form a U-shaped member, the closed end of the U-shaped member being bent to form a hook detachably engageable with the frame member and the open end of the U-shaped member being bent to form a pair of hooks separately detachably engageable with the frame member.

2. In a buckle of the class described, a frame member, and a U-shaped spring slide connected thereto, the said slide having a body portion lying throughout its length in the plane of the frame member, and end portions bent toward each other to resiliently and detachably engage the frame member.

3. In a device of the character described, a frame and a spring slide detachably connected thereto, the said slide including leg portions spaced longitudinally of the said frame and having end portions adapted to hook around the frame and resiliently held in engagement therewith, one of the said leg portions being provided with a laterally offset clamping portion arranged substantially in the plane of the frame.

4. In a buckle of the character described, a frame, a separate slide adapted for sliding engagement on the said frame, the said slide including leg portions joined to each other at one end and spaced apart at their opposite ends, the said leg portions being spaced longitudinally of the said frame and being yieldably held in spaced relation to each other, the said end portions of the slide being bent toward each other and being adapted for detachable snap-on engagement with the said frame.

5. In a fastener, a single piece of material shaped to form a main frame, a loop member and a neck connecting said main frame to said loop member, and spaced bars slidably mounted on said main frame connecting the sides of said main frame and dividing the interior thereof into three sections to provide for the adjustable connection of a strap to said frame.

6. In a buckle, a frame, a loop formed integral with one side of said frame, a separate slide adapted for sliding engagement on said frame, the said slide including leg portions joined to each other at one end and spaced apart at their opposite ends, the said leg portions being spaced longitudinally of the said frame and being yieldably held in spaced relation to each other, the said end portions of the slide being bent toward each other and being adapted for detachable snap-on engagement with said frame.

7. In a fastener, a frame, means providing for the adjustable connection of a strap to said frame, a loop member adapted for engagement with a button, and a neck integrally connecting said loop member to one side of said frame, said loop member being provided with portions extending at substantially right angles to said neck whereby said loop member is also adapted for engagement with the material adjacent a buttonhole.

8. In a buckle of the class described, a frame member, and a spring slide connected thereto, the said slide comprising a single length of material bent to form a U-shaped member, the closed end of the U-shaped member being bent to form a hook engageable with the frame member and the open end of the U-shaped member being bent to form a pair of hooks engageable with the frame member.

9. In a buckle of the class described, a frame member having spaced sides, and a U-shaped member slidably mounted on said frame member and connecting said spaced sides, the closed end of the U-shaped member being bent to form a hook engageable with one side of the frame member and the open end of the U-shaped member being bent to form a pair of hooks engageable with the opposite side of said frame member, the legs of said U-shaped member being resiliently held in spaced relation to each other by the closed end of the U-shaped member, and one of said legs being provided with a laterally offset clamping portion.

10. In a buckle of the class described, a substantially rectangular frame having spaced sides, a pair of spaced bars slidably mounted on said frame and connecting the sides thereof, said bars being resiliently connected together at one end and being free from connection with each other at their other end whereby said bars slide as a unit on said frame and are resiliently held in spaced relation to each other, one of said bars being provided with an offset portion and said bars dividing said frame into outer, inner and intermediate slots, and a strap threaded through said outer slot around said bars, then through said inner slot, then through the slot between said bars, and then back through the outer slot whereby reversely directed portions of the strap are entered in said outer slot.

11. In a fastener, a frame having spaced sides, and spaced bars slidably mounted on said frame and connecting the spaced sides thereof, said bars being integrally connected at one of their ends and being free from connection to each other at their other ends, the free ends of said bars being return-bent to embrace one side of the frame and the integrally connected ends of said bars being return-bent to embrace the other side of said frame whereby said bars may slide as a unit on said frame.

12. In a fastener, the combination with a frame, of a clamping device comprising a pair of bars slidably mounted on said frame, one of said bars being formed with an offset extending toward said other bar.

13. A fastener including in combination, a frame member, and a plurality of bars slidably mounted thereon, one of said bars having a portion offset in the direction of the other of said bars.

14. A fastener including in combination, a frame member, and a plurality of bars slidably mounted thereon, one of said bars having a portion offset in the direction of the other of said bars and arranged in the plane of said frame.

In testimony whereof I affix my signature.

BIRDORA H. WHITE.